(12) United States Patent  
Nogle

(10) Patent No.: US 8,858,394 B2  
(45) Date of Patent: Oct. 14, 2014

(54) APPARATUS AND METHOD FOR AUTOMATED TRANSMISSION CLUTCH FILL DURING ENGINE START-STOP OPERATION

(71) Applicant: Chrysler Group LLC, Auburn Hills, MI (US)

(72) Inventor: Thomas D. Nogle, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 132 days.

(21) Appl. No.: 13/624,113

(22) Filed: Sep. 21, 2012

(65) Prior Publication Data

US 2013/0075221 A1 Mar. 28, 2013

Related U.S. Application Data

(60) Provisional application No. 61/538,230, filed on Sep. 23, 2011.

(51) Int. Cl.  
*F16H 15/50* (2006.01)  
*F16D 13/52* (2006.01)

(52) U.S. Cl.  
USPC ........................................ 477/115; 192/85.38

(58) Field of Classification Search  
USPC ....... 477/115, 127; 475/100, 101; 192/114 R, 192/85.63, 85.38  
See application file for complete search history.

(56) References Cited

U.S. PATENT DOCUMENTS

| | | | | | |
|---|---|---|---|---|---|
| 4,838,126 | A | * | 6/1989 | Wilfinger et al. | 477/129 |
| 5,105,922 | A | * | 4/1992 | Yant | 192/3.58 |
| 6,827,194 | B2 | * | 12/2004 | Steinel et al. | 192/85.51 |
| 6,905,433 | B2 | * | 6/2005 | Schmidt et al. | 475/121 |
| 2008/0190724 | A1 | * | 8/2008 | Vogel | 192/3.57 |
| 2010/0051408 | A1 | * | 3/2010 | Ulbricht et al. | 192/85.63 |

FOREIGN PATENT DOCUMENTS

| | | | |
|---|---|---|---|
| DE | 40 19 746 C1 | 8/1991 | |
| DE | 42 39 233 A1 | 5/1994 | |
| FR | 2 830 586 A1 | 4/2003 | |
| GB | 789 285 A | 1/1958 | |
| JP | 02162125 A * | 6/1990 | 477/115 |
| WO | WO 2006/128637 A1 | 12/2006 | |

\* cited by examiner

*Primary Examiner* — Roger Pang  
(74) *Attorney, Agent, or Firm* — Ralph E Smith

(57) ABSTRACT

An apparatus and a method for engaging a friction element, e.g., a clutch, in an automatic transmission. The apparatus includes a piston contained within a housing that is used to apply pressure to and operate the friction element. The piston divides the housing into first and second chambers that are supplied with fluid by various valves. The pressure of the fluid in the chambers controls the position of the piston.

18 Claims, 3 Drawing Sheets

APPARATUS AND METHOD FOR AUTOMATED TRANSMISSION CLUTCH FILL DURING ENGINE START-STOP OPERATION

CROSS-REFERENCE TO RELATED APPLICATION

This application claims the benefit of U.S. Provisional Ser. No. 61/538,230, filed Sep. 23, 2011.

FIELD

The present disclosure relates to an apparatus and a method for operating an automatic transmission during an engine start-stop operation and, more particularly to, an apparatus and a method for automated transmission clutch fill during engine start-stop operation.

BACKGROUND

Some vehicles are equipped with engines that use a start-stop operation to reduce fuel consumption. The start-stop operation allows the engine to be automatically shut-off when the vehicle comes to a stop and the transmission is in drive. For example, an engine in a vehicle using the start-stop operation is shut-off when the vehicle is temporarily stopped at a stop light. The vehicle re-starts the engine once the driver presses the gas pedal to commence traveling when the stop light turns green. By shutting off the engine when the vehicle is stopped, fuel consumption can be reduced.

Starting the engine with the transmission in drive, however, creates some problems. When in drive, the transmission has to be ready with sufficient pressure in its elements to support engine torque as the engine starts back up. If the transmission is not ready, then the engine is not be able to transfer torque to the transmission and the vehicle hesitates after the driver presses the gas pedal.

This hesitation is a result of the automatic transmission's design. Automatic transmissions use hydraulically driven pistons with return springs to operate the clutches that are used to engage the transmission's gears. When the engine of a vehicle is turned off, all of the hydraulic pressure in the transmission is lost and the pistons' return springs stroke the pistons away from the clutches. As a result, before the pistons can apply pressure to the clutches so that the transmission can support the engine torque, the hydraulic system must provide sufficient pressure to the pistons to overcome the force of the return springs and stroke the pistons into contact with the clutches.

To reduce this hesitation, vehicles that employ the start-stop operation use an electric pump to maintain some hydraulic pressure in the pistons. This allows the transmission to create the pressure necessary to engage the clutches associated with first gear more quickly and reduce hesitation of the vehicle after a start-stop operation. These electric pump systems, however, are costly and require additional logic, valves, and sensors to implement. What is needed is a design that allows a transmission to quickly create the pressure necessary to engage the clutch associated with first gear during a start-stop operation without changing the operation of the transmission during normal use and without the need for the costly, logic, valves and sensors currently used.

SUMMARY

The present disclosure provides an apparatus for engaging a friction element in an automatic transmission of a vehicle. The apparatus may include a housing and a piston for engaging the friction element that is at least partially contained within the housing. The piston may divide the housing into first and second chambers. The apparatus may also include a fluid supply apparatus for supplying fluid to the first and second chambers, wherein a position of the piston may be determined by a pressure of the fluid in the first chamber and a pressure of the fluid in the second chamber.

The fluid supply apparatus may also include a first valve that supplies fluid to the first chamber and a second valve that supplies fluid to the second chamber. The first valve may be a limit valve that limits the pressure of the fluid in the first chamber. The first valve may limit the fluid pressure in the first chamber to between ten to fifteen pounds per square inch. The second valve may be part of a valve body of the automatic transmission and the first valve may be separate from the valve body. The second valve may control the fluid pressure in the second chamber. When the fluid pressure is greater in the second chamber than in the first chamber, the piston may engage the friction element. The fluid pressures in the first and second chambers may be reduced to substantially zero when the engine is shut-off. Additionally, the piston may maintain its position when the engine is shut-off.

The present disclosure also provides a method for engaging a friction element in an automatic transmission of a vehicle. The method may include providing a piston able to engage the friction element. The piston may be at least partially contained within a housing and divide the housing into first and second chambers. The method may also include supplying fluid to the first and second chambers, wherein a position of the piston may be determined by a pressure of the fluid in the first chamber and a pressure of the fluid in the second chamber.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
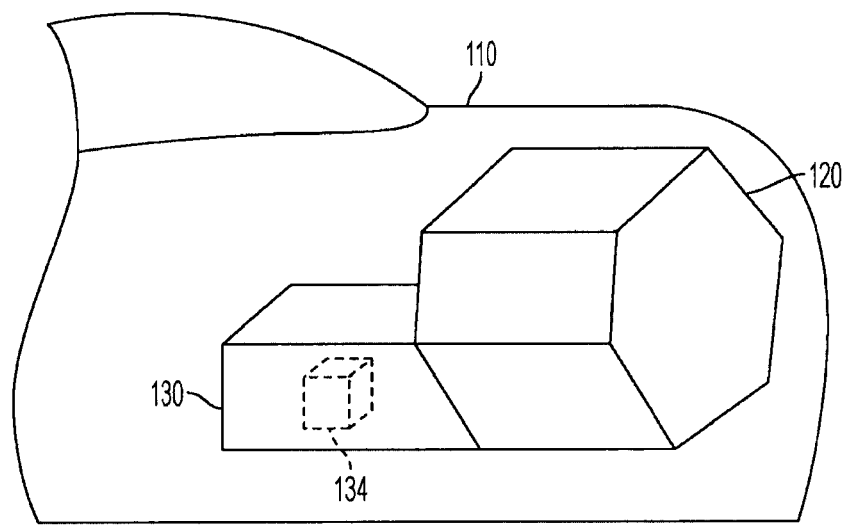
FIG. 1 illustrates a vehicle with an automatic transmission.

FIG. 1 shows a vehicle 110 that includes an engine 120 coupled to an automatic transmission 130. The engine 120 is coupled to the transmission 130 to provide torque to the transmission 130 during operation of the vehicle. The transmission 130 uses friction elements, such as clutches, to engage gears that transfer the torque produced by the engine 120 to the vehicle's 110 wheels. The transmission 130 includes a friction element engagement system 134 that causes at least one friction element to engage a gear in the transmission 130.

Figure 2:
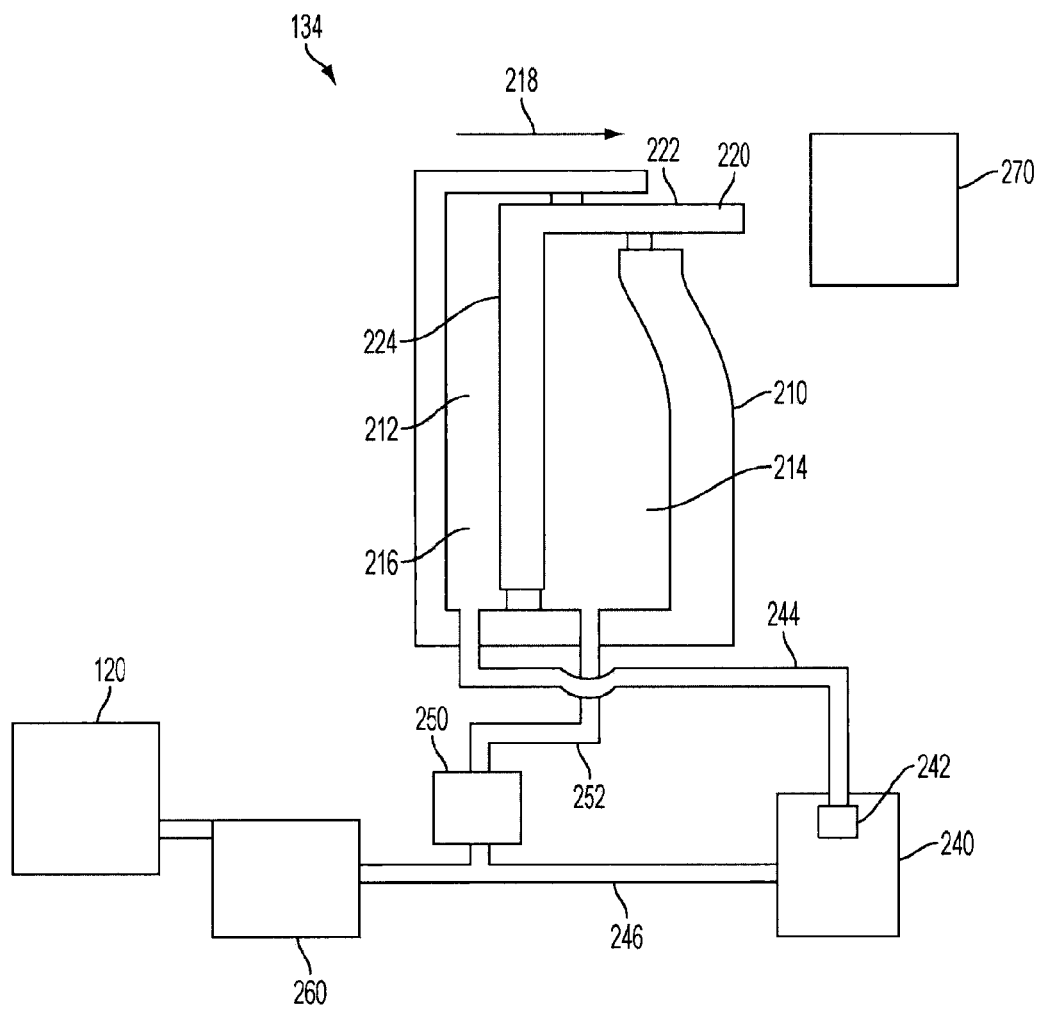
FIG. 2 illustrates a friction element engagement system in accordance with a disclosed embodiment.

FIG. 2 illustrates the friction element engagement system 134 in accordance with a disclosed embodiment. The friction element engagement system 134 includes a piston housing 210, piston 220, valve body 240, limit valve 250, and fluid pump 260. The piston housing 210 houses the piston 220 and is coupled to the valve body 240 by a friction element feed circuit 244. The piston housing 210 is also coupled to the limit valve 250 by a limit valve feed circuit 252. The limit valve 250 and valve body 240 are coupled to the fluid pump 260 by a valve body feed circuit 246.

The piston 220 includes a piston engagement arm 222 and a piston controller arm 224 that are coupled together. The piston controller arm 224 is located within a hollow interior 212 of piston housing 210 and divides the hollow interior 212 into a first chamber 214 and a second chamber 216. The piston controller arm 224 is able to move laterally within the hollow interior 212. The piston controller arm 224 also acts as a seal between the first and second chambers 214, 216 so that fluid does not freely pass between them. However, it is possible that some venting of fluid between the first and second chambers 214, 216 may occur in some situations.

One end of piston engagement arm 222 extends out of the piston housing 210 and the other end is coupled to the piston controller arm 224 within the piston housing 210. Lateral movement of the piston controller arm 224 in the direction of arrow 218 extends the piston engagement arm 222 out of the piston housing 210. Lateral movement of the piston controller arm 224 in the opposite direction of arrow 218 draws the piston engagement arm 222 into the piston housing 210.

The first chamber 214 is in fluid communication with the limit valve feed circuit 252. Lateral movement of the piston controller arm 224 does not interrupt the fluid communication between the limit valve feed circuit 252 and the first chamber 214. The limit valve feed circuit 252 supplies fluid from the limit valve 250 to the first chamber 214.

The second chamber 216 is in fluid communication with the friction element feed circuit 244. Lateral movement of the piston controller arm 224 does not interrupt the fluid communication between the friction element feed circuit 244 and the second chamber 216. The friction element feed circuit 244 supplies fluid from the valve body 240 to the second chamber 216. In particular, the friction element feed circuit 244 supplies fluid from the friction element valve 242 that is a part of the valve body 240.

The fluid pump 260 supplies fluid to the limit valve 250 and the valve body 240 by way of the valve body feed circuit 246. The fluid may be a petroleum based fluid or other type of fluid that may function as a hydraulic fluid. The fluid pump 260 is mechanically coupled to the engine 120. As a result, when the engine 120 is running, the fluid pump 260 supplies fluid to the limit valve 250 and the valve body 240. When the engine 120 is stopped, however, the fluid pump 260 does not supply any fluid. Any fluid pressure in the piston housing 210, the valve body 240, the limit valve 250, and their connecting feed circuits dissipates when the fluid pump 260 stops pumping because the friction element engagement system 134 is vented and allows the fluid to bleed back into a containment area (not shown).

The limit valve 250 limits the pressure of fluid supplied to the first chamber 214. In the illustrated embodiment, the limit valve 250 limits the fluid pressure in the first chamber 214 to between five to twenty pounds per square inch. In some embodiments, the limit valve 250 may limit the fluid pressure in the first chamber 214 to between ten to fifteen pounds per square inch. As mentioned above, the limit valve 250 only maintains the fluid pressure in the first chamber 214 when the fluid pump 260 is operating.

The valve body 240 comprises a network of valves that assist in controlling the automatic transmission 130. It should be appreciated that other electrical or mechanical systems may also assist in controlling the automatic transmission 130.

The valve body 240 has a plurality of valves that direct fluid to pistons and other devices to activate various functions of the automatic transmission 130, such as shifting from one gear to another. The friction element valve 242, within the valve body 240, controls the flow of fluid to the second chamber 216. If the friction element valve 242 is open and the fluid pump 260 is operating, fluid flows into second chamber 216 until the second chamber 216 has a fluid pressure of between twenty to one hundred and twenty pounds of pressure per square inch. If the friction element valve 242 is closed, there is little to no fluid pressure in the second chamber 216. If the fluid pump 260 is not pumping then there will be little to no fluid pressure in the second chamber 216 regardless of the position of the friction element valve 242.

The piston 220, as controlled by the friction element engagement system 134, engages and disengages a friction element 270 e.g., a clutch, within the automatic transmission 130. For example, with the engine 120 running, the fluid pump 260 supplies fluid to the friction element engagement system 134. As a result, fluid pressure is created in the first chamber 214, which applies pressure to the piston controller arm 224. If the friction element valve 242 is not open, then there is little to no fluid pressure in the second chamber 216. As a result, the fluid pressure in the first chamber 214 pushes the piston controller arm 224 in the opposite direction of arrow 218. This lateral movement of the piston controller arm 224 draws the piston engagement arm 222 into the piston housing 210 and away from the friction element 270.

Figure 3:
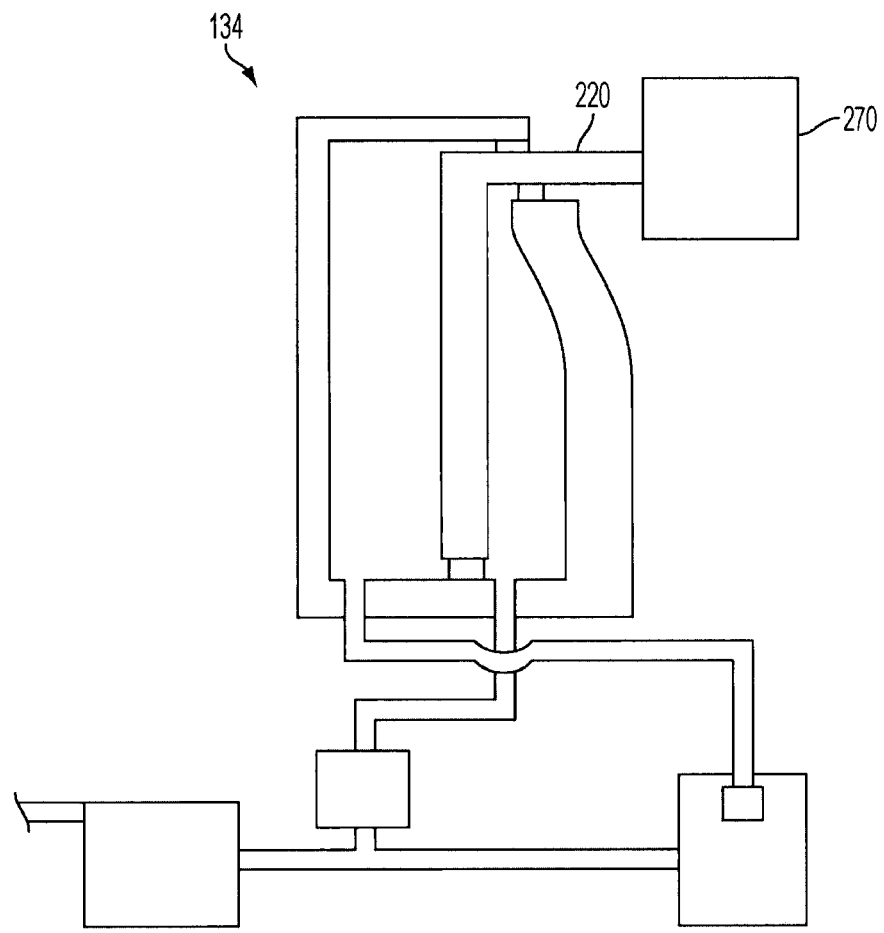
FIG. 3 illustrates a friction element engagement system engaging a friction element.

When the automatic transmission 130 needs to engage the friction element 270, it opens the friction element valve 242. With the friction element valve 242 open, fluid pressure builds in the second chamber 216 and applies pressure to the piston controller arm 224. Once the fluid pressure in the second chamber 216 is greater than the fluid pressure in the first chamber 214, the fluid pressure in the second chamber 216 pushes the piston controller arm 224 in the direction of arrow 218. This lateral movement of the piston controller arm 224 extends the piston engagement arm 222 out of the piston housing 210 and causes the piston 220 to engage and apply pressure to the friction element 270, as illustrated in FIG. 3.

When the transmission 130 needs to disengage the friction element 270, for example, when the transmission 130 needs to shift gears, the transmission 130 closes the friction element valve 242. With the friction element valve 242 closed, the fluid in the second chamber 216 bleeds out to reduce the fluid pressure in the second chamber 216 until there is little or no pressure in the second chamber 216. The fluid pressure in the first chamber 214 is then sufficient to the push piston controller arm 224 in the opposite direction of arrow 218. The lateral movement of the piston controller arm 224 draws the piston engagement arm 222 into the piston housing 210 and causes the piston 220 to disengage the friction element 270.

When the engine 120 of the vehicle 110 is stopped, as explained previously, the fluid pump 260 stops pumping fluid. As a result, the fluid pressure in both the first chamber 214 and the second chamber 216 dissipates because the piston housing 210 is vented. The fluid pressure in the first and the second chambers 214, 216 may be substantially zero after the fluid dissipates. With the fluid pressure in both the first and second chambers 214, 216 dissipating at the same time, the piston 220 maintains the position it had when the fluid pump 260 stopped pumping fluid.

The friction element engagement system 134 may be used in a vehicle that uses start-stop operations. A start-stop operation is when a vehicle stops its engine with the transmission in drive when the vehicle is temporarily stopped during normal driving conditions, such as when the vehicle is stopped at a traffic light.

For example, if the vehicle 110 uses start-stop operations, the friction element engagement system 134 may engage a friction element 270 used by the transmission 130 to implement first gear. During normal driving conditions, when the transmission 130 is in drive and the engine 120 is running, the fluid pump 260 supplies fluid to the limit valve 250 and the valve body 240 to allow the transmission 130 to engage its friction elements and properly transfer the engine's 120 torque to the vehicle's 110 wheels. When the vehicle 110 comes to a stop, the transmission 130 is in first gear. With the transmission 130 in first gear, the friction element valve 242 is open and supplying fluid to the second chamber 216 causing the piston 220 to engage and apply pressure to the friction element 270 as shown in FIG. 3. Once the vehicle 110 stops, the engine 120 is stopped. As a result, the fluid pump 260 stops pumping and the fluid pressure in the first and second chambers 214, 216 dissipates. Because the fluid pressure in both the first and second chambers 214, 216 dissipate at the same time, the piston 220 does not disengage the friction element 270.

When the engine 120 starts again, the fluid pump 260 begins to pump fluid to the second chamber 216 through the open friction element valve 242. Any fluid pressure in the second chamber 216 applies pressure to piston 220, which is then transferred to the friction element 270, thereby allowing the transmission 130 to support torque from the engine 120. Thus, the vehicle 110 does not need to wait for pressure to build to stroke the piston 220 and for the piston 220 to contact the friction element 270 so that the transmission 130 can support the engine's 120 torque. Further, no additional electric pumps, wiring, logic sensors, or other parts are used to eliminate the time needed for pressure to build to stroke the piston 220 and for the piston 220 to contact the friction element 270.

While the friction element engagement system 134 has been described as engaging friction elements used to implement first gear, the friction element engagement system 134 may be used to engage all of the frictions elements in a transmission, only some of the friction elements, or only the friction elements not used for first gear.

What is claimed is:

1. An apparatus for engaging a friction element in a transmission of a vehicle, the apparatus comprising:
    a housing;
    a piston at least partially contained within the housing and dividing the housing into first and second chambers, the piston for engaging the friction element; and
    a fluid supply apparatus for supplying fluid to the first and second chambers, wherein a position of the piston is determined by a pressure of the fluid in the first chamber and a pressure of the fluid in the second chamber, and wherein the fluid pressures in the first and second chambers are reduced to substantially zero when an engine connected to the automatic transmission is shut-off.

2. The apparatus of claim 1, wherein the fluid supply apparatus comprises a first valve that supplies fluid to the first chamber and a second valve that supplies fluid to the second chamber.

3. The apparatus of claim 2, wherein the first valve is a limit valve that limits the pressure of the fluid in the first chamber.

4. The apparatus of claim 2, wherein the first valve limits the fluid pressure in the first chamber to between ten to fifteen pounds per square inch.

5. The apparatus of claim 2, wherein the second valve is part of a valve body of the automatic transmission.

6. The apparatus of claim 5, wherein the second valve controls the fluid pressure in the second chamber.

7. The apparatus of claim 5, wherein the first valve is separate from the valve body.

8. The apparatus of claim 1, wherein the piston engages the friction element when the fluid pressure is greater in the second chamber than in the first chamber.

9. The apparatus of claim 1, wherein the piston maintains its position when the engine is shut-off.

10. A method of engaging a friction element in an automatic transmission of a vehicle, said method comprising:
    providing a piston for engaging the friction element, the piston being at least partially contained within a housing and dividing the housing into first and second chambers;
    supplying fluid to the first chamber; and
    supplying fluid to the second chamber, wherein a position of the piston is determined by a pressure of the fluid in the first chamber and a pressure of the fluid in the second chamber, and
    wherein the fluid pressures in the first and second chambers are reduced to substantially zero when an engine connected to the automatic transmission is shut-off.

11. The method of claim 10, wherein a first valve supplies fluid to the first chamber and a second valve supplies fluid to the second chamber.

12. The method of claim 11, wherein the first valve is a limit valve that limits the pressure of the fluid in the first chamber.

13. The method of claim 11, wherein the first valve limits the fluid pressure in the first chamber to between ten to fifteen pounds per square inch.

14. The method of claim 11, wherein the second valve is part of a valve body of the automatic transmission.

15. The method of claim 14, wherein the second valve controls the fluid pressure in the second chamber.

16. The method of claim 14, wherein the first valve is separate from the valve body.

17. The method of claim 10, wherein the piston engages the friction element when the fluid pressure is greater in the second chamber than in the first chamber.

18. The method of claim 10, wherein the piston maintains its position when the engine is shut-off.

* * * * *